US008335698B2

(12) United States Patent
Angell et al.

(10) Patent No.: US 8,335,698 B2
(45) Date of Patent: Dec. 18, 2012

(54) OPTIMIZING CLUSTER BASED COHORTS TO SUPPORT ADVANCED ANALYTICS (75) Inventors: Robert Lee Angell, Salt Lake City, UT (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/054,084

(22) Filed: Mar. 24, 2008

(65) Prior Publication Data

US 2009/0240513 A1 Sep. 24, 2009

(51) Int. Cl.
G06Q 50/00 (2012.01)
G06Q 10/00 (2012.01)
(52) U.S. Cl. .............................. 705/3; 705/2
(58) Field of Classification Search .......... 705/2, 3
See application file for complete search history.

(56) References Cited

U.S. PATENT DOCUMENTS

| | | | |
|---|---|---|---|
| 7,623,823 B2 | 11/2009 | Zito et al. | |
| 7,788,702 B1 | 8/2010 | Harris | |
| 7,809,660 B2 | 10/2010 | Friedlander et al. | |
| 7,870,085 B2 | 1/2011 | Angell et al. | |
| 7,877,346 B2 | 1/2011 | Karty | |
| 7,953,686 B2 | 5/2011 | Angell et al. | |
| 2001/0034023 A1* | 10/2001 | Stanton et al. | 435/6 |
| 2002/0077853 A1* | 6/2002 | Boru et al. | 705/2 |
| 2002/0194117 A1 | 12/2002 | Nabe et al. | |
| 2004/0171056 A1* | 9/2004 | Stanton, Jr. | 435/6 |
| 2005/0069936 A1* | 3/2005 | Diamond et al. | 435/6 |
| 2007/0118419 A1 | 5/2007 | Maga et al. | |
| 2007/0244701 A1 | 10/2007 | Erlanger et al. | |
| 2007/0282665 A1 | 12/2007 | Buehler et al. | |
| 2007/0291118 A1 | 12/2007 | Shu et al. | |
| 2008/0026485 A1* | 1/2008 | Hueber et al. | 436/507 |
| 2008/0082356 A1* | 4/2008 | Friedlander et al. | 705/2 |
| 2008/0082399 A1 | 4/2008 | Noble et al. | |
| 2008/0208903 A1 | 8/2008 | Friedlander et al. | |
| 2008/0273088 A1 | 11/2008 | Shu et al. | |
| 2009/0234810 A1 | 9/2009 | Angell et al. | |
| 2009/0240556 A1 | 9/2009 | Angell et al. | |
| 2009/0240695 A1 | 9/2009 | Angell et al. | |

OTHER PUBLICATIONS

ClinicalTrials.gov, "Glossary of Clinical Trials Terms." as downloaded from U.S. National Institutes of Health on Aug. 16, 2010.*
Sibband et al., "Understanding controlled trials Crossover trials" BMJ 316: 1719 Jun. 6, 1998.*

(Continued)

Primary Examiner — Neal Sereboff
(74) Attorney, Agent, or Firm — Yee & Associates, P.C.; John R. Pivnichny (57) ABSTRACT A computer implemented method, apparatus, and computer program product is provided for selecting subjects for treatment study cohorts. A set of selected dimensions for optimizing selection of subjects for a treatment cohort group and a control cohort group associated with a treatment study is identified. Attribute data associated with subjects in the pool of available subjects is clustered at the atomic level to form clustered cohort data. A set of optimized subjects from a pool of available subjects is selected using the clustered cohort data and the set of selected dimensions. Subjects in the set of optimized subjects are optimized across the set of selected dimensions. Each subject in the set of optimized subjects is assigned to the treatment cohort group or the control cohort group.

25 Claims, 6 Drawing Sheets

OTHER PUBLICATIONS

U.S. Appl. No. 11/678,997, filed Feb. 26, 2007, Friedlander et al.

Brown et al., "IBM Smart Surveillance System (S3): An Open and Extensible Architecture for Smart Video Surveillance," http://research.microsoft.com/iccv2005/demo/ibm_s3/ibms3_iccv05demo, pp. 1-4, Sep. 2005.

Colombi et al., "Cohort Selection and Word Grammar Effects for Speaker Recognition," ICASSP-96, 1996 IEEE International Conference on Acoustics, Speech, and Signal Processing, Atlanta, Georgia, 1:85-88, May 7-10, 1996.

Shu et al., "IBM Smart Surveillance System (S3): A Open and Extensible Framework for Event Based Surveillance," AVSS 2005, IEEE Conference on Advanced Video and Signal Based Surveillance, Como, Italy, pp. 318-323, Sep. 15-16, 2005.

Wang et al., "Improving Generalizing Capability of Connectionist Model Through Emergent Dynamic Behavior," IJCNN International Joint Conference on Neural Networks, Baltimore, Maryland, 1:353-358, Jun. 7-11, 1992.

Wu et al., "Syntactic Heads in Statistical Language Modeling," ICASSP '00, Proceedings of the IEEE International Conference on Acoustics, Speech, and Signal Processing, Istanbul, Turkey, 3:1699-1702, Jun. 2000.

Kim et al., "Prediction of Prosodic Phrase Boundaries Considering Variable Speaking Rate," Proceedings of the 4th International Conference on Spoken Language, Philadelphia, Pennsylvania, Oct. 3-6, 1996, 3:1505-1508.

Notice of Allowance regarding U.S. Appl. No. 12/049,725, dated Jan. 20, 2011, 10 pages.

Office Action regarding U.S. Appl. No. 121050,537, dated Mar. 4, 2011, 8 pages.

Final Office Action regarding U.S. Appl. No. 12/050,537, dated Sep. 12, 2011, 12 pages.

Office Action regarding U.S. Appl. No. 12/050,537, dated Mar. 29, 2012, 7 pages.

Office Action regarding U.S. Appl. No. 12/050,720, dated Mar. 18, 2011, 21 pages.

Final Office Action regarding U.S. Appl. No. 12/050,720, dated Sep. 1, 2011, 20 pages.

\* cited by examiner

OPTIMIZING CLUSTER BASED COHORTS TO SUPPORT ADVANCED ANALYTICS

BACKGROUND OF THE INVENTION

1. Field of the Invention

The present invention is related generally to an improved data processing system and in particular to a method and apparatus for generating cohort groups. More particularly, the present invention is directed to a computer implemented method, apparatus, and computer usable program code for optimizing selection of members of cohort groups across a plurality of dimensions.

2. Background Description

A cohort is a group of people or objects that share one or more attributes in common. An attribute is a characteristics or experience. For example, a group of people born in 1980 may form a birth cohort. A cohort may include one or more sub-cohorts. For example, the birth cohort of people born in 1980 may include a sub-cohort of people born in 1980 in Salt Lake City, Utah. A sub-sub-cohort may include people born in 1980 in Salt Lake City, Utah to low income, single parent households.

A cohort study is typically a longitudinal study that monitors or tracks cohort groups over time to identify trends, rates of disease in the cohorts, cohort behavior, success of medical treatments or pharmaceuticals, and/or other factors, events, and behaviors associated with the members of the cohort group. For a particular study to be successful, the members of the cohort groups may be required to possess one or more minimum attributes. The study may also be more effective if other attributes, such as life expectancy, age, and other attributes are also present. However, the number of possible attributes that may be of interest in a treatment study may be so numerous and/or complex that it is time consuming, expensive, difficult or impossible for a human user to optimize selection of members of cohort groups for the treatment study across all the attributes of interest.

BRIEF SUMMARY OF THE INVENTION

According to one embodiment of the present invention, a computer implemented method, apparatus, and computer program product is provided for selecting subjects for treatment study cohorts. A set of selected dimensions for optimizing selection of subjects for a treatment cohort group and a control cohort group associated with a treatment study is identified. Attribute data associated with subjects in the pool of available subjects is clustered at the atomic level to form clustered cohort data. A set of optimized subjects from a pool of available subjects is selected using the clustered cohort data and the set of selected dimensions. Subjects in the set of optimized subjects are optimized across the set of selected dimensions. Each subject in the set of optimized subjects is assigned to the treatment cohort group or the control cohort group. Each subject in the set of optimized subjects is assigned to the treatment cohort group or the control cohort group to minimize differences between the subjects in the treatment cohort group and the subjects in the control cohort group.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
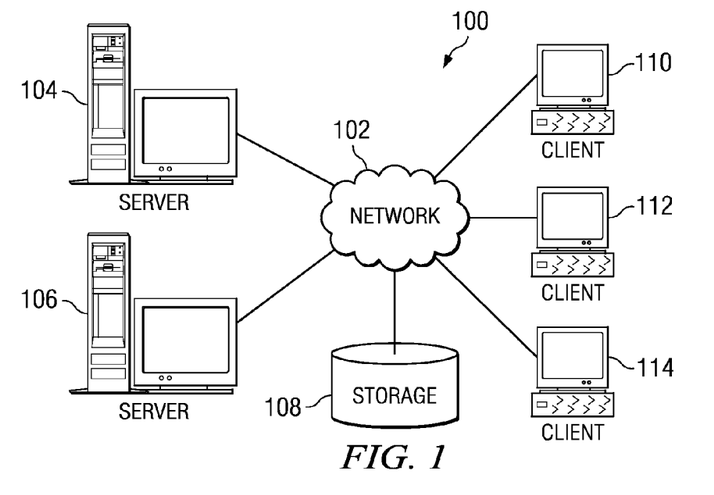
FIG. 1 is a block diagram of a network of data processing systems in which illustrative embodiments may be implemented.
Figure 2:
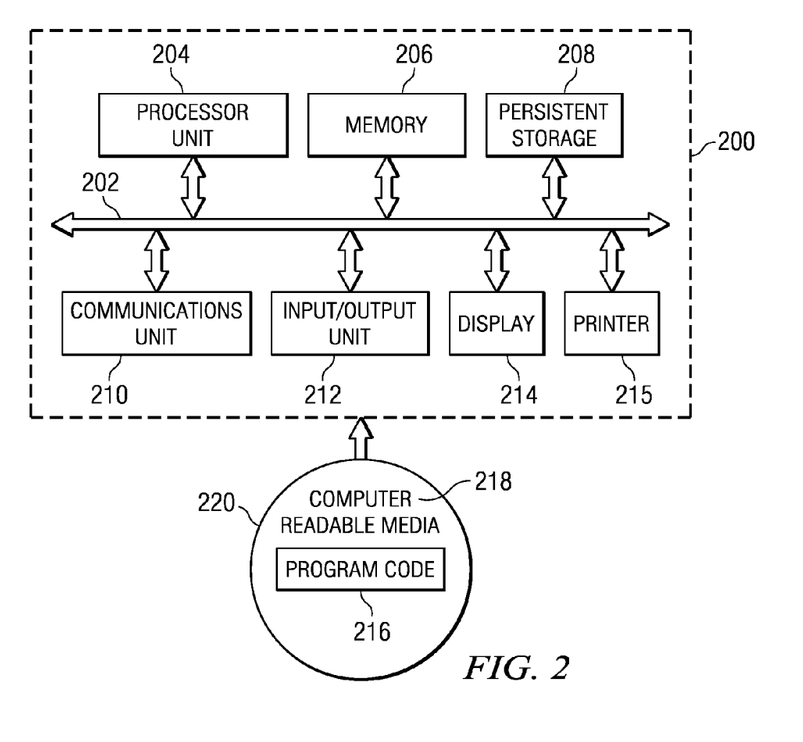
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, display 214, and printer 215.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user. Printer 215 is a device that is capable of printing output on a paper medium.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Many clinical problems are best analyzed at a cohort group level. Currently, generating cohort groups suitable to a particular study and tracking these cohort groups may be a time consuming, expensive, and/or inefficient process. Thus, according to one embodiment of the present invention, a computer implemented method, apparatus, and computer program product is provided for selecting subjects for treatment study cohorts. A set of selected dimensions for optimizing selection of subjects for a treatment cohort group and a control cohort group associated with a treatment study is identified. A treatment study may include, without limitation, medical studies, psychology studies, and social sciences studies. The term "set" refers to one or more. Thus, the set of selected dimensions may include one or more dimensions.

Attribute data associated with subjects in the pool of available subjects is clustered at the atomic level to form clustered cohort data. Atomic data is data stored at the finest possible degree of granularity.

A set of optimized subjects from a pool of available subjects is selected using the clustered cohort data for subjects in the pool of available subjects and the set of selected dimensions. A dimension is a criteria, characteristic, or attribute that is minimized or maximized. For example, a dimension may include non-smokers and non-drinkers. The selection of subjects for the treatment cohort groups and the control cohort groups will be selected in a manner that preferentially chooses available subjects that do not drink and do not smoke. In this manner, the dimension of non-smokers and non-drinkers in the treatment study is maximized.

Each subject in the set of optimized subjects is assigned to the treatment cohort group or the control cohort group. Subjects in the set of optimized subjects are optimized across the set of selected dimensions. Each subject in the set of optimized subjects is assigned to the treatment cohort group or the control cohort group to minimize differences between the subjects in the treatment cohort group and the subjects in the control cohort group.

Figure 3:
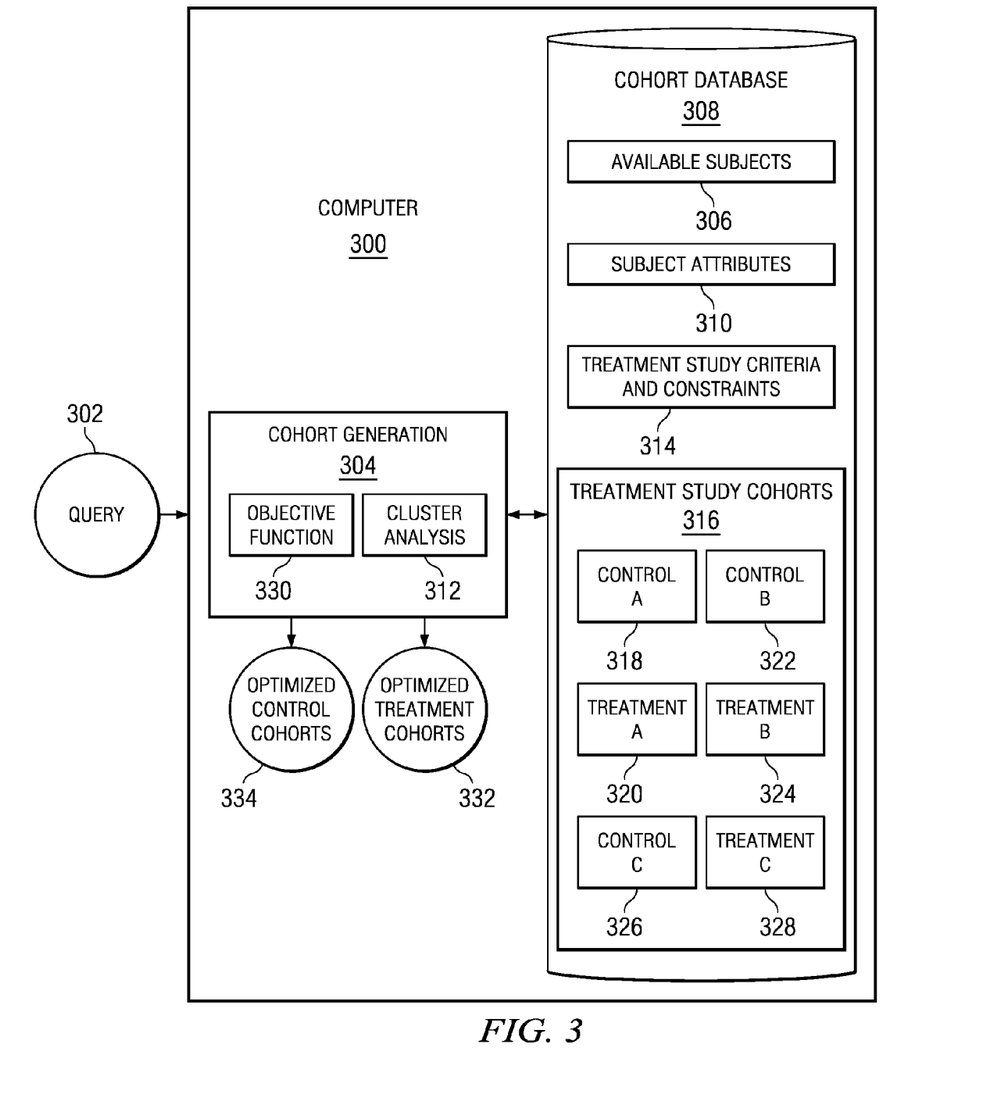
FIG. 3 is a block diagram of a data processing system for generating optimized cohort groups for a treatment plan in accordance with an illustrative embodiment.

FIG. 3 is a block diagram of a data processing system for generating optimized cohort groups for a treatment plan in accordance with an illustrative embodiment. Computer 300 may be implemented using any type of computing device, such as a server, a client computer, a laptop computer, a personal digital assistant (PDA), or any other computing device depicted in FIGS. 1 and 2.

Computer 300 receives query 302. Query 302 is a request from a user for one or more control cohort groups and treatment cohort groups for a treatment study. The treatment study may include multiple different treatments. A different treatment cohort group and control cohort group may be needed for each different treatment.

Cohort generation 304 is software that generates cohort treatment groups and cohort control groups that satisfies a set of minimum criteria for the treatment study, satisfies a set of constraints, and cohort groups that are optimized across a set of dimensions. The set of dimensions may include any type of dimension. A dimension may include, for example and without limitation, an age range, occupation(s), habits, diagnosis, level of consistent exercise, medications taken currently or in the past, life expectancy, or any other factor. A treatment study associated with asbestos exposure may wish to maximize the number of subjects in the study that have never smoked, worked with asbestos insulation on a regular basis as part of an occupation, and have no history of lung disease in the family. In such a case, the set of dimensions includes non-smokers, no lung disease in the family history, and occupations associated with insulation installation prior to 1985. Cohort generation 304 selects subjects from available subjects 306 that maximize or minimize these dimensions.

Available subjects 306 is a pool of available subjects that satisfy a set of minimum criteria for the treatment study. In the example given above, the minimum criteria may include subjects with no current indications of lung disease at the time the study begins. In this example, any subjects with indications of lung disease pre-existing are not included in the pool of available subjects 306.

Cohort database 308 is a data storage device for storing data associated with subjects and treatment studies. Cohort database 308 may be implemented on a hard drive, a flash memory, a main memory, read only memory (ROM), a random access memory (RAM), or any other type of data storage device. Cohort database 308 may be implemented in a single data storage device or a plurality of data storage devices. Cohort database 308 may be located entirely on a data storage device that is local to computer 300 or on a device located remotely to computer 300. The remote data storage devices are accessed via a network connection, such as network 102 in FIG. 1. The data storage may be a central data storage or a decentralized data storage, such as, without limitation, a grid data processing system, a federated database, and/or any other type of distributed data storage device.

Subject attributes 310 are also stored on cohort database 308. Subject attributes 310 are attributes associated with one or more subjects in available subjects 306. Subject attributes 310 may include demographic information, such as name, age, and residence. Subject attributes 310 may also include medical history information, information describing the subject's habits, whether the subject is a smoker, non-smoker, a drinker, how much the subject drinks on a weekly or monthly basis, current medical treatments being received by the subject, past medical treatments received by the subject, family history of disease and illness, current levels of exercise performed by the subject on a daily or weekly basis, the subject's diet, weight, prescriptions, past and present occupations, and any other information that may be relevant to the treatment study.

Treatment study criteria and constraints 314 is a listing of minimum required criteria and constraints that must be satisfied before a subject will qualify to participate in the treatment study. The criteria and constraints may include factors such as age, life expectancy, amount of alcohol consumed, amount of tobacco products consumed by the subject, or any other criteria or constraints. For example, a treatment study may require that subjects have a minimum life expectancy of ten years or more for the long term aspects of the study to be successful.

Treatment study cohorts 316 are cohort groups that are needed for treatments in a single treatment study. For example, a single treatment study may require three treatment groups and three control groups. In this example, those groups are represented by control A 318 and corresponding treatment A 320, control B 322 and treatment B 324, and finally control C 326 and treatment C 328. The treatment groups 320, 324, and 328 are groups that will receive a treatment. The control groups, such as control 318, 322, and 326 are groups that will not receive any treatment. Typically, the control groups are given a placebo that has no treatment value.

Cohort generation 304 identifies a set of selected dimensions for optimizing selection of subjects for treatment study cohorts 316. Cohort generation 304 includes cluster analysis 312. Cluster analysis 312 is a software component that clusters subject attributes 310 data associated with available subjects 306 at the atomic level to form clustered cohort data.

Objective function 330 is an optimization function that selects subjects with attributes that minimizes or maximizes dimensions in the set of dimensions. In other words, objective function 330 selects a set of optimized subjects from a pool of available subjects using the clustered cohort data and the set of selected dimensions. The subjects in the set of optimized subjects are optimized across the set of selected dimensions. Cohort generation 304 assigns each subject in the set of optimized subjects to the treatment cohort groups or the control cohort groups in treatment study cohorts to form optimized treatment cohorts 332 and optimized control cohorts 334.

A given subject assigned to a control cohort group remains available for assignment to other different control cohort groups. A given subject is permitted to be a member of more than one control cohort group. However, any subject assigned to any control cohort group is unavailable for assignment to any treatment cohort group. Likewise, a given subject assigned to a treatment cohort group is unavailable for assignment to any other different treatment cohort group. The given subject assigned to the treatment cohort group is also unavailable for assignment to any control cohort group. Each subject in the set of optimized subjects is assigned to the treatment cohort group or the control cohort group to minimize differences between the subjects in the treatment cohort groups and the subjects in the control cohort groups.

Figure 4:
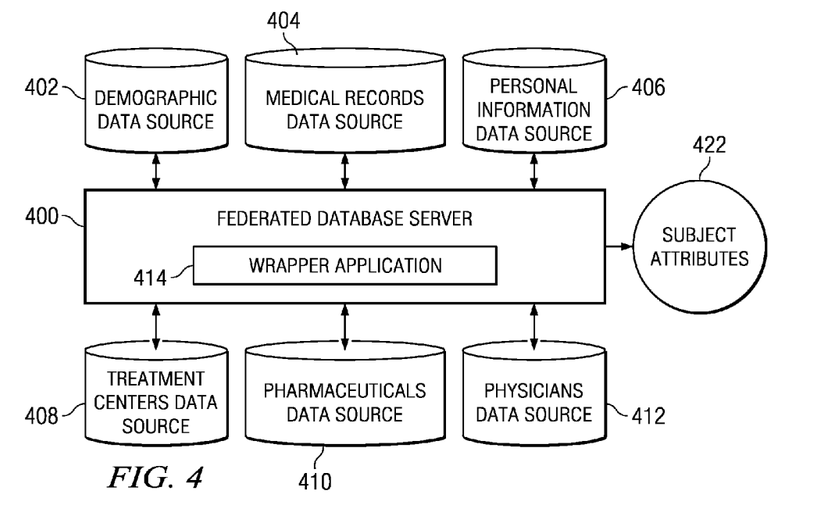
FIG. 4 is a block diagram of a federated database server in accordance with an illustrative embodiment.

Referring now to FIG. 4, a block diagram of a federated database server is shown in accordance with an illustrative embodiment. Federated database server 400 is a server associated with a federated database, such as federated database server 304 in FIG. 3. Federated database server 400 may be used to implement a database for storing cohort data and treatment study data, such as cohort database 308 in FIG. 3.

Federated database server 400 is a meta-database management system which transparently integrates multiple autonomous database systems into a single virtual database, that is, a federated database. The constituent database systems remain autonomous, separate, and distinct. In this example, the constituent database systems include a plurality of data sources, such as, without limitation, demographic data source 402, medical records data source 404, personal information data source 406, treatment centers data source 408, pharmaceutical data source 410, and physicians data source 412.

Demographic data source 402 comprises one or more sources of data providing demographic information associated with available subjects of the treatment study, such as available subjects 306 in FIG. 3. Medical records data source 404 comprises one or more sources of medical records for the target individual and/or other individuals receiving medical treatments. Personal information data source 406 is one or more sources of personal information regarding the target individual and/or other individuals that are, or have received, medical treatments. Treatment centers data sources 408 is one or more sources of data describing medical treatment facilities, such as, without limitation, hospitals, non-emergency clinics, doctor offices, nurses stations, red cross stations, diagnostic centers, outpatient care facilities, nursing homes, and/or assisted living, and/or any other facility providing medical care.

Pharmaceuticals data source 410 is one or more sources of information regarding prescription drugs, non-prescription drugs, vaccinations, and/or durable medical devices. Physician data source 412 includes one or more sources of data describing physicians, hospital affiliations/privileges of the physicians, specialists, locations of offices, physicians specializing in providing particular treatments, physicians on particular health care insurance plans, and/or any other information regarding physicians.

The data sources shown in FIG. 4 are only examples of possible data sources associated with federated database server 400. Federated database server 400 is not required to have access to all of the types of data sources depicted in FIG. 4. Moreover, federated database server 400 may have access to additional data sources not shown in FIG. 4. For example, an additional data source may include a treatment plan data source that provides information associated with the given treatment study, such as the minimum criteria that subjects of the treatment study must satisfy, attributes of interest to the treatment study, length of the treatment study, number of subjects needed in the treatment cohort groups and control cohort groups.

Wrapper application 414 is software for generating wrappers. Wrappers are software modules that enable federated database server 400 to communicate with the data sources. A wrapper is generated for each data source or each type of data source. An application, such as a cohort generation software engine, can submit a query to federated database server 400. In response, federated database server 400 optimizes the query, develops an execution plan that decomposes the query into a plurality of queries that can be executed at each data source, and invokes the appropriate wrappers to execute the queries to the data sources. The data returned to federated database server 400 from the data sources in response to the query are combined and processed by federated database server 400 to form subject attributes 422. Subject attributes 422 is data associated with attributes of one or more potential subjects of the treatment study. The cohort generation software engine optimizes subject attributes 422 across multiple dimensions to generate optimized treatment cohort groups and optimized control cohort groups for use in the treatment study.

Figure 5:
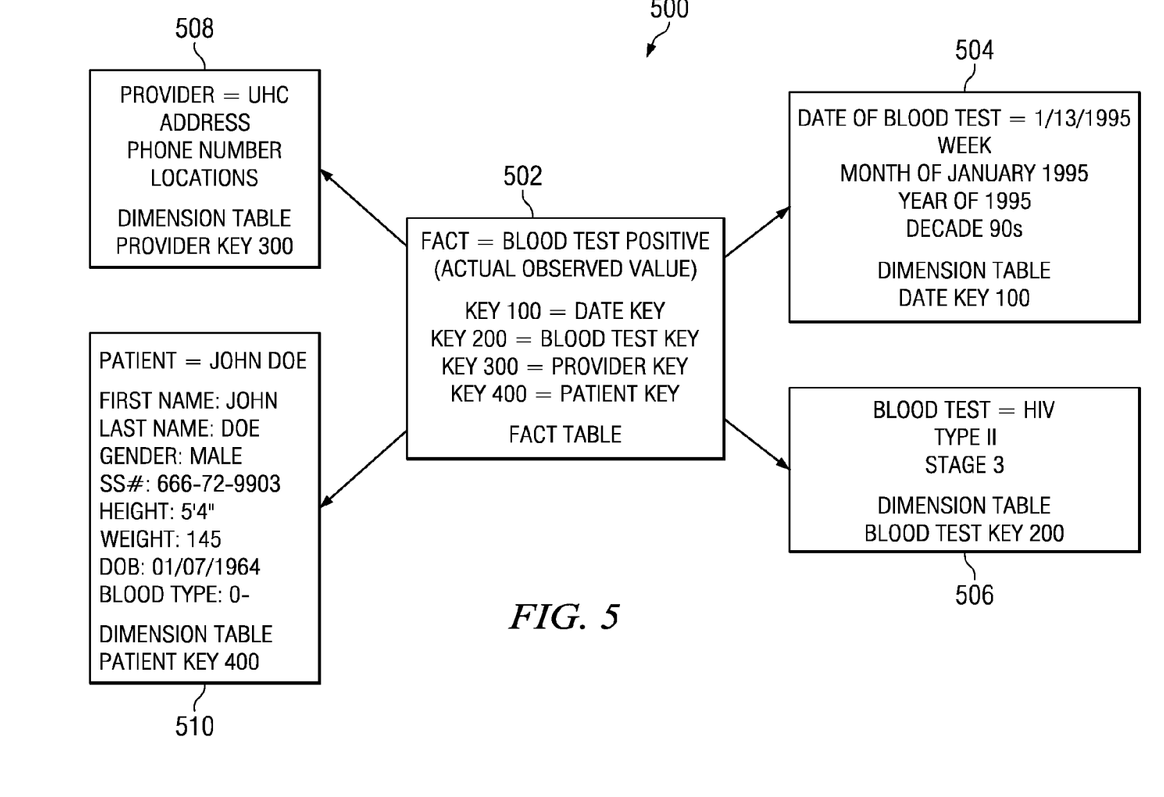
FIG. 5 is a block diagram of a data source having a fact table and dimension tables in accordance with an illustrative embodiment.

FIG. 5 is a block diagram of a data source having a fact table and dimension tables in accordance with an illustrative embodiment. Data source 500 is a data source having fact tables and dimension tables, such as data source 310 in FIG. 3. It will be understood that FIG. 5 is only an exemplary embodiment of fact tables and dimension tables according to some embodiments of the present invention and, therefore, embodiments of the present invention should not be limited to the configuration illustrated therein. For example, more than four dimension tables may be provided or less than four dimensions tables may be provided without departing from the teachings of the present invention.

Fact table 502 includes an observation that this patient's blood tested positive for diabetes and identification keys 504-510, which identify different dimension tables associated with fact table 500. Dimension table 504 associated with date key 100 provides information about the date the blood test in fact table 500 was taken. The information provided in the date dimension table may also be drilled out to the week, month or year in which the test was taken.

The blood test key 200 provides access to blood test dimension table 506. Blood test dimension table 506 may provide information about the blood test, for example, the positive blood test was for type II diabetes in stage 3. This information may be drilled out beyond the blood test level to all blood tests for this patient, all blood tests for any patients having similar results and the like.

The provider key 300 provides access to provider dimension table 508. Provider dimension table 508 may provide information about the patient's healthcare provider, for example, United Healthcare (UHC). Dimension table 508 may include the provider's address, telephone number, copay, locations and the like.

Finally, the patient key 400 provides access to patient dimension table 510, which provides information about the patient having the positive blood test. Patient dimension table 510 may include the patient's first and last name, gender, social security number, height, weight, date of birth, blood type and the like.

The dimension tables according to some embodiments of the present invention may be expanded to provide a broader view of the information available in the database or a narrower view of the information provided in the database (drill in and out). For example, the criteria of interest may be side effects and/or adverse reactions to a particular brand of drug and/or dosage of the drug. The results of this query may be quite large as the side effects and adverse reactions may range from a rash to death. Thus, the information may be narrowed to just those patients who experienced a rash as a result of taking the drug. The information may be further narrowed to look at each patient experiencing the rash individually or patients that are women between the ages of 20 and 40. Furthermore, the type of drug may be expanded to provide all of the drugs in the particular class of drugs. These examples of drilling in and out of the data are provided for exemplary purposes only and, therefore, embodiments of the present invention are not be limited to these examples.

A first set of data, by itself, may be of little value, but together with other data combinations of the first set of data and other data, patterns associated with the quality of life of available subjects receiving certain drugs at particular dosages, rates of hospital acquired infections, treatment complications, and costs of treatments, may become evident. Similarly, patterns or events are often discernable only by piecing together data from multiple individuals or cohorts spread throughout the data.

Figure 6:
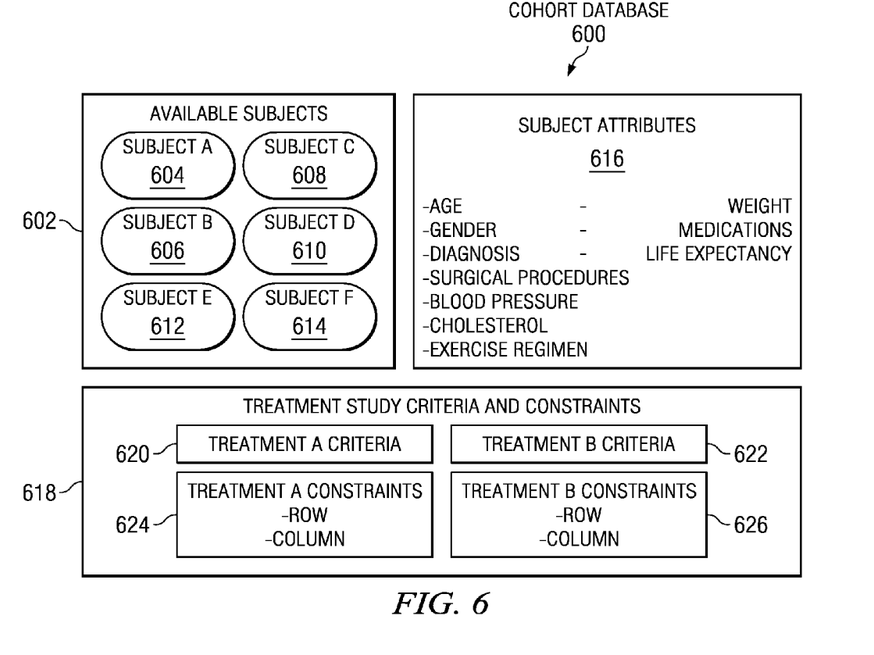
FIG. 6 is a block diagram of a cohort database in accordance with an illustrative embodiment.

FIG. 6 is a block diagram of a cohort database in accordance with an illustrative embodiment. Cohort database 600 is a database for storing cohort data, treatment study data, and attribute data for available subjects, such as cohort database 308 in FIG. 3. Available subjects 602 are subjects that satisfy the minimum criteria for the treatment study. For example, available subjects 602 may include subjects 604-614.

Subject attributes 616 are attributes of available subjects 602, such as subject attributes 310 in FIG. 3. The attributes may include, but are not limited to, age, gender, weight, current and past medications taken, diagnosis of illness and/or disease, life expectancy, surgical procedures performed on subject in the past, present, or surgical procedures expected to be performed in the future, blood pressure, cholesterol levels, or exercise regimen. Subject attributes 616 may include additional information not shown, such as occupation, residency, nationality, race, or any other information. Moreover, the embodiments are not required to utilize all of the information shown in subject attributes 616. Subject attributes 616 is not required to provide information describing all the attributes shown in FIG. 6.

Treatment study criteria and constraints 618 is a listing of minimum criteria and constraints that may be required for subjects in a treatment study, such as treatment study criteria and constraints 314 in FIG. 3. In this example, the treatment study includes two treatments, treatment A and treatment B. Treatment A includes criteria 620. Treatment B includes criteria 622. To be selected for treatment A, a subject must satisfy all the criteria in criteria 620. Each treatment comprises constraints that may further prevent a subject from participating in a study if the constraints are present. Treatment A constraints 624 and treatment B constraints 626 include row and column constrains.

For example, but without limitation, if a subject qualifies for participation in both treatment A and treatment B, constraints 624 will not prevent the subject from being assigned to a treatment cohort group for treatment A. However, once the subject is assigned to the treatment cohort group for treatment A, constraints 626 prevent the subject from being assigned to a treatment group or a control group for treatment B because a subject cannot be a member of a treatment group for two different treatments at the same time.

Figure 7:
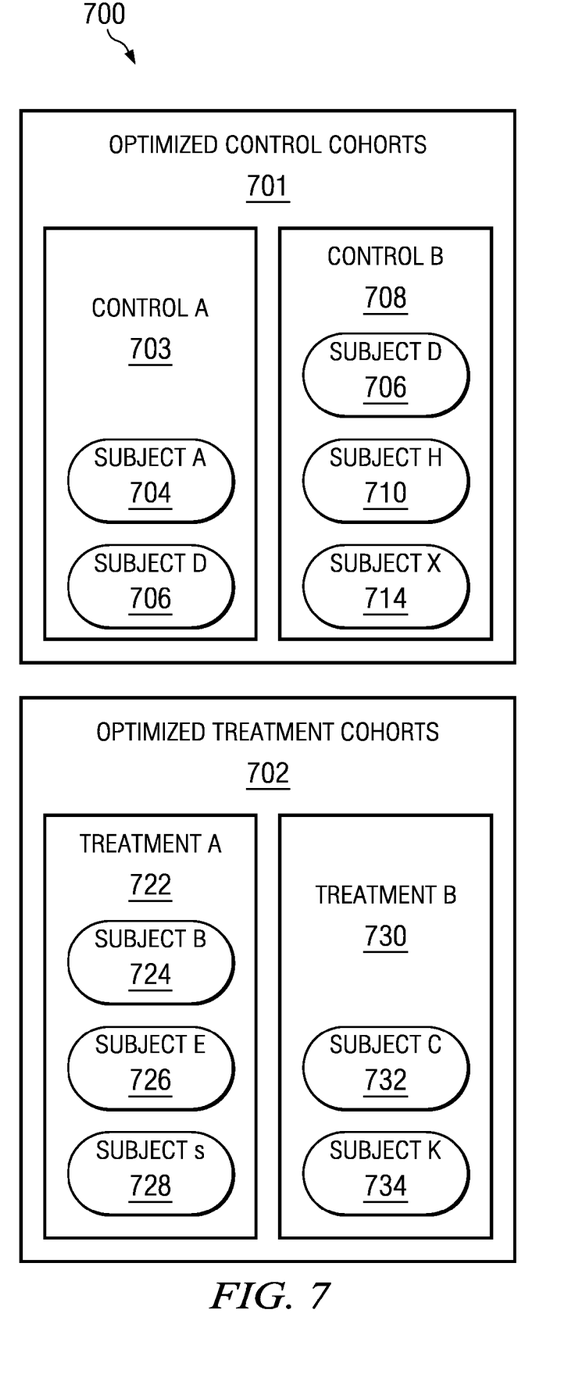
FIG. 7 is a block diagram of optimized cohort groups generated for a treatment study in accordance with an illustrative embodiment.

FIG. 7 is a block diagram of optimized cohort groups generated for a treatment study in accordance with an illustrative embodiment. Optimized cohort groups 700 are cohort groups that have been optimized across a set of dimensions and in accordance with the minimum criteria and any constraints. Optimized control cohorts 701 are control cohort groups. Control A 703 includes one or more subjects, such as subject A 704 and subject D 706. Control B 708 includes subject D 706, subject H 710 and subject X 714. A subject may be a member of more than one control group. In this example, subject D 706 is a member of control A 703 cohort group and control B 708 cohort group. The control cohort groups are not limited to two or three members. The control cohort groups may include additional members not shown in FIG. 7.

Optimized treatment cohorts 702 are optimized cohort groups that will receive treatments. For example, treatment A 722 is a treatment cohort group corresponding to control A 703 cohort group. Treatment A 722 includes subject B 724, subject E 726, and subject S 728. Treatment B 730 has been assigned subject C 732 and subject K 734. A member of a treatment cohort group cannot be a member of any other treatment cohort group or control cohort group. Thus, subject B 724 cannot be assigned as a member of treatment B 730 or control B 708. Again, treatment cohort groups are not limited to two or three members. A treatment cohort group may include any number of members.

Figure 8:
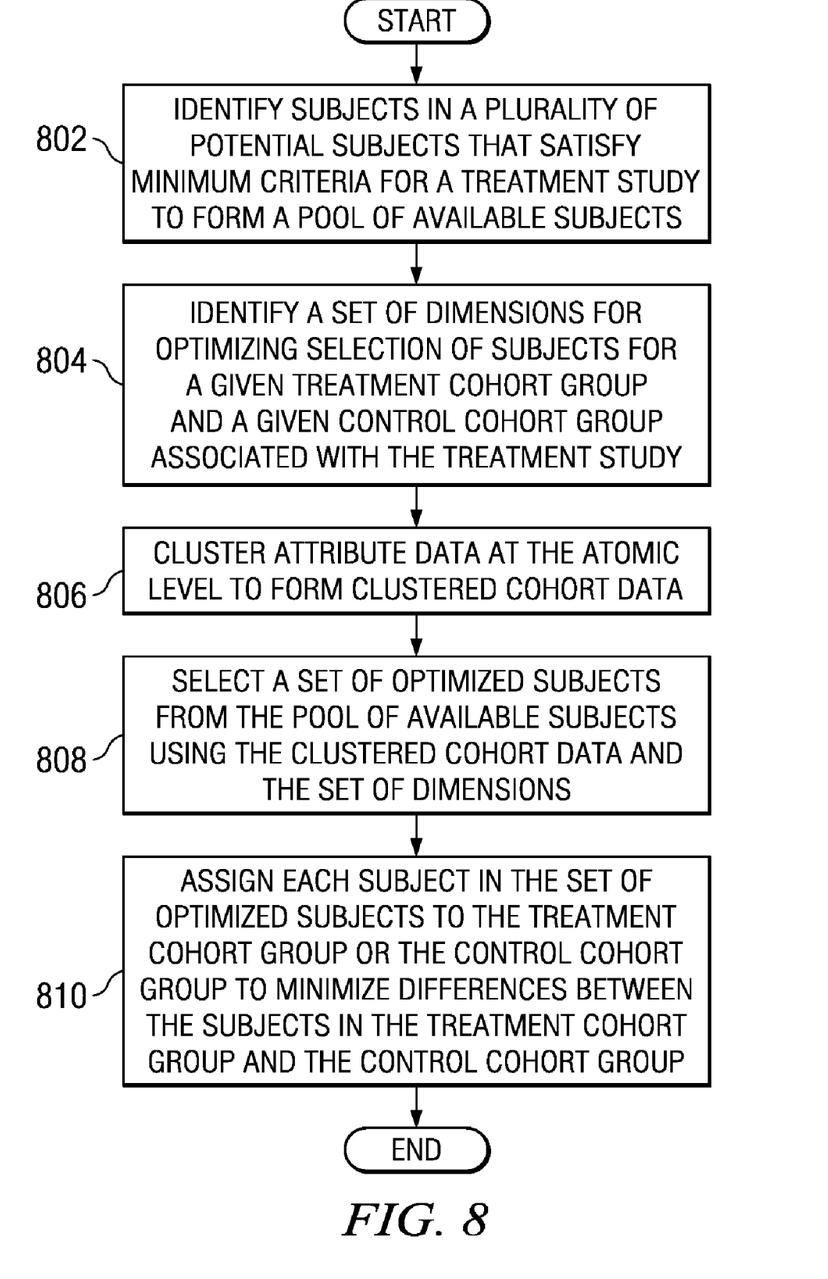
FIG. 8 is a flowchart illustrating a process for generating optimized cohort treatment groups and optimized cohort control groups in accordance with an illustrative embodiment.

FIG. 8 is a flowchart illustrating a process for generating optimized cohort treatment groups and optimized cohort control groups in accordance with an illustrative embodiment. The process in FIG. 8 is implemented by software for optimizing selection of members of cohort groups across multiple dimensions, such as cohort generation 304 in FIG. 3.

The process identifies subjects in a plurality of potential subjects that satisfy minimum criteria for a treatment study to form a pool of available subjects (step 802). The process identifies a set of dimensions for optimizing selection of subjects for a given treatment cohort group and a given control cohort group associated with a treatment plan (step 804). The process clusters attribute data at the atomic level to form clustered cohort data (step 806). The process selects a set of optimized subjects from the pool of available subjects using the clustered cohort data and the set of dimensions (step 808). The process assigns each subject in the set of optimized subjects to the treatment cohort group or the control cohort group to minimize differences between the subjects in the treatment cohort group and the control cohort group (step 810) with the process terminating thereafter.

Thus, according to one embodiment of the present invention, a computer implemented method, apparatus, and computer program product is provided for selecting subjects for treatment study cohorts. A set of selected dimensions for optimizing selection of subjects for a treatment cohort group and a control cohort group associated with a treatment study is identified. Attribute data associated with subjects in the pool of available subjects is clustered at the atomic level to form clustered cohort data. A set of optimized subjects from a pool of available subjects is selected using the clustered cohort data for subjects in the pool of available subjects and the set of selected dimensions. Each subject in the set of optimized subjects is assigned to the treatment cohort group or the control cohort group. Subjects in the set of optimized subjects are optimized across the set of selected dimensions. Each subject in the set of optimized subjects is assigned to the treatment cohort group or the control cohort group to minimize differences between the subjects in the treatment cohort group and the subjects in the control cohort group.

The cohort generation enables high through-put usage of the cohort groups across a range of treatment studies and a variety of industries. The cohort generation enables tracking changes through time of the measures of clustered data with a supporting database. In addition, the cohort generation is able to select the best and most optimal members for each cohort treatment group and each cohort control group where available cohorts may be suitable for more than one treatment cohort group and/or control cohort group associated with a particular treatment study.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selecting subjects for treatment study cohort groups, the computer implemented method comprising:
   identifying, by a processor, a set of selected dimensions for optimizing selection of subjects for a treatment cohort group and a control cohort group associated with a treatment study;
   clustering, by the processor, attribute data associated with subjects in a pool of available subjects at an atomic level to form clustered cohort data;
   selecting, by the processor, a set of optimized subjects from the pool of available subjects using the clustered cohort data and the set of selected dimensions, wherein subjects in the set of optimized subjects are optimized across the set of selected dimensions; and
   assigning, by the processor, each subject in the set of optimized subjects to the treatment cohort group or the control cohort group, wherein the each subject in the set of optimized subjects is assigned to the treatment cohort group or the control cohort group to minimize differences between the subjects in the treatment cohort group and the subjects in the control cohort group.

2. The computer implemented method of claim 1 wherein an objective function selects the subjects from the pool of available subjects to optimize the selection of subjects across the set of selected dimensions.

3. The computer implemented method of claim 1 wherein the treatment study comprises a plurality of treatments, wherein each treatment is associated with a treatment cohort group and a control cohort group, and further comprising:
   assigning, by the processor, subjects in the pool of available subjects to each treatment cohort group and each control cohort group associated with each treatment in the plurality of treatments in accordance with a set of constraints for the each treatment in the plurality of treatments, and wherein the subjects are assigned to the each treatment cohort group and the each control cohort group to optimize the set of dimensions for the each treatment cohort group and the each control cohort group.

4. The computer implemented method of claim 1 further comprising:
   identifying, by the processor, a set of minimum criteria and a set of constraints associated with each treatment in a plurality of treatments associated with the treatment study, wherein each treatment is associated with a treatment cohort group and a control cohort group;
   identifying, by the processor, subjects in a plurality of potential subjects that satisfy the set of minimum criteria and the set of constraints to form the pool of available subjects;
   analyzing, by the processor, attribute data associated with each subject in the pool of available subjects to form cohort data;
   selecting a set of subjects for each treatment cohort group associated with the each treatment using the cohort data, wherein the set of subjects for the each treatment cohort group comprises subjects that satisfy the set of minimum criteria and the set of constraints, and wherein the each treatment is associated with a different set of constraints.

5. The computer implemented method of claim 1 wherein a given subject in the pool of available subjects assigned to the control cohort group remains available for assignment to other different control cohort groups, wherein a given subject is permitted to be a member of more than one control cohort group, and wherein any subject assigned to any control cohort group is unavailable for assignment to any treatment cohort group.

6. The computer implemented method of claim 1 further comprising:
   responsive to a determination that a subject in the pool of available subjects is a desirable subject for both a first treatment and a second treatment associated with the treatment study, assigning, by the processor, the first subject to a control cohort group for the first treatment and a control cohort group for the second treatment, wherein the assignment of the subject to control cohort groups optimizes selection of subjects for a maximum number of control cohort groups; and
   responsive to a determination that the subject is desirable for only the first treatment associated with the treatment study, assigning, by the processor, the subject to a treatment cohort group associated with the first treatment.

7. The computer implemented method of claim 1 wherein a given subject assigned to the treatment cohort group is unavailable for assignment to any other different treatment cohort group, and wherein the given subject assigned to the treatment cohort group is unavailable for assignment to any control cohort group.

8. The computer implemented method of claim 1 wherein the treatment cohort group comprises subjects that receive a given treatment and wherein the control cohort group comprises subjects that do not receive the given treatment.

9. The computer implemented method of claim 1 wherein the subjects in the set of optimized subjects comprises subjects having attributes that minimizes at least one dimension in the set of selected dimensions.

10. The computer implemented method of claim 1 wherein the subjects in the set of optimized subjects comprises subjects having attributes that maximizes at least one dimension in the set of selected dimensions.

11. A computer program product for selecting subjects for treatment study cohort groups, the computer program product comprising:
a computer storage device;
program code stored on the computer-readable medium for identifying a set of selected dimensions for optimizing selection of subjects for a treatment cohort group and a control cohort group associated with a treatment study;
program code stored on the computer-readable medium for clustering attribute data associated with subjects in a pool of available subjects at an atomic level to form clustered cohort data;
program code stored on the computer-readable medium for selecting a set of optimized subjects from the pool of available subjects using the clustered cohort data and the set of selected dimensions, wherein subjects in the set of optimized subjects are optimized across the set of selected dimensions; and
program code stored on the computer-readable medium for assigning each subject in the set of optimized subjects to the treatment cohort group or the control cohort group, wherein the each subject in the set of optimized subjects is assigned to the treatment cohort group or the control cohort group to minimize differences between the subjects in the treatment cohort group and the subjects in the control cohort group.

12. The computer program product of claim 11 wherein an objective function selects the subjects from the pool of available subjects to optimize the selection of subjects across the set of selected dimensions.

13. The computer program product of claim 11 wherein the treatment study comprises a plurality of treatments, wherein each treatment is associated with a treatment cohort group and a control cohort group, and further comprising:
program code stored on the computer-readable medium for assigning subjects in the pool of available subjects to each treatment cohort group and each control cohort group associated with each treatment in the plurality of treatments in accordance with a set of constraints for the each treatment in the plurality of treatments, and wherein the subjects are assigned to the each treatment cohort group and the each control cohort group to optimize the set of dimensions for the each treatment cohort group and the each control cohort group.

14. The computer program product of claim 11 further comprising:
program code stored on the computer-readable medium for identifying a set of minimum criteria and a set of constraints associated with each treatment in a plurality of treatments associated with the treatment study;
program code stored on the computer-readable medium for identifying subjects in a plurality of potential subjects that satisfy the set of minimum criteria and the set of constraints to form the pool of available subjects;
program code stored on the computer-readable medium for analyzing attribute data associated with each subject in the pool of available subjects to form cohort data;
program code stored on the computer-readable medium for selecting a set of subjects for each treatment cohort group associated with the each treatment using the cohort data, wherein the set of subjects for the each treatment cohort group comprises subjects that satisfy the set of minimum criteria and the set of constraints, and wherein the each treatment is associated with a different set of constraints.

15. The computer program product of claim 11 wherein a given subject assigned to the control cohort group remains available for assignment to other different control cohort groups, wherein a given subject is permitted to be a member of more than one control cohort group, wherein any subject assigned to any control cohort group is unavailable for assignment to any treatment cohort group, wherein a given subject assigned to the treatment cohort group is unavailable for assignment to any other different treatment cohort group, and wherein the given subject assigned to the treatment cohort group is unavailable for assignment to any control cohort group.

16. The computer program product of claim 11 further comprising:
program code stored on the computer-readable medium for assigning a subject to a control cohort group for a first treatment and a control cohort group for a second treatment in response to a determination that the subject is a desirable subject for both the first treatment and the second treatment associated with the treatment study, wherein the assignment of the subject to control cohort groups optimizes selection of subjects for a maximum number of control cohort groups; and
program code stored on the computer-readable medium for assigning the subject to a treatment cohort group associated with the first treatment in response to a determination that the subject is desirable for only the first treatment associated with the treatment study.

17. The computer program product of claim 11 wherein the subjects in the set of optimized subjects comprises subjects having attributes that minimizes at least one dimension in the set of selected dimensions.

18. The computer program product of claim 11 wherein the subjects in the set of optimized subjects comprises subjects having attributes that maximizes at least one dimension in the set of selected dimensions.

19. An apparatus comprising:
a bus system;
a communications system coupled to the bus system;
a memory connected to the bus system, wherein the memory includes computer usable program code; and
a processing unit coupled to the bus system, wherein the processing unit executes the computer-usable program code to identify a set of selected dimensions for optimizing selection of subjects for a treatment cohort group and a control cohort group associated with a treatment study; cluster attribute data associated with subjects in a pool of available subjects at an atomic level to form clustered cohort data; select a set of optimized subjects from the pool of available subjects using the clustered cohort data and the set of selected dimensions; and assign each subject in the set of optimized subjects to the treatment cohort group or the control cohort group, wherein subjects in the set of optimized subjects are optimized across the set of selected dimensions, and wherein the each subject in the set of optimized subjects is assigned to the treatment cohort group or the control cohort group to minimize differences between the subjects in the treatment cohort group and the subjects in the control cohort group.

20. The apparatus of claim 19 wherein an objective function selects the subjects from the pool of available subjects to optimize the selection of subjects across the set of selected dimensions.

21. The apparatus of claim 19 wherein the treatment study comprises a plurality of treatments, wherein each treatment in the plurality of treatments comprises a treatment cohort group and a control cohort group, and wherein subjects in the pool of available subjects are assigned to treatment cohort groups and control cohort groups associated with each treatment in the plurality of treatments in accordance with a set of constraints for the each treatment in the plurality of treatments, and wherein the subjects are assigned to the each treatment cohort group and the each control cohort group to optimize the set of dimensions.

22. The apparatus of claim 19 wherein a given subject assigned to the control cohort group remains available for assignment to other different control cohort groups, wherein a given subject is permitted to be a member of more than one control cohort group, wherein any subject assigned to any control cohort group is unavailable for assignment to any treatment cohort group, wherein a given subject assigned to the treatment cohort group is unavailable for assignment to any other different treatment cohort group, and wherein the given subject assigned to the treatment cohort group is unavailable for assignment to any control cohort group.

23. The apparatus of claim 19 wherein the processor unit further executes the computer-usable program code to assign a subject to a control cohort group for a first treatment and a control cohort group for a second treatment in response to a determination that the subject is a desirable subject for both the first treatment and the second treatment associated with the treatment study, wherein the assignment of the subject to control cohort groups optimizes selection of subjects for a maximum number of control cohort groups; and assign the subject to a treatment cohort group associated with the first treatment in response to a determination that the subject is desirable for only the first treatment associated with the treatment study.

24. The apparatus of claim 19 wherein the subjects in the set of optimized subjects comprises subjects having attributes that minimizes at least one dimension in the set of selected dimensions.

25. The apparatus of claim 19 wherein the subjects in the set of optimized subjects comprises subjects having attributes that maximizes at least one dimension in the set of selected dimensions.

* * * * *